United States Patent
Farajidana et al.

(10) Patent No.: US 8,867,495 B2
(45) Date of Patent: Oct. 21, 2014

(54) FEEDBACK MECHANISMS FOR BEAMFORMING OPERATION

(75) Inventors: Amir Farajidana, Sunnyvale, CA (US);
Alexei Gorokhov, San Diego, CA (US);
Kapil Bhattad, San Diego, CA (US);
Ravi Palanki, San Diego, CA (US);
Juan Montojo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 387 days.

(21) Appl. No.: 12/724,915

(22) Filed: Mar. 16, 2010

(65) Prior Publication Data

US 2010/0238824 A1    Sep. 23, 2010

Related U.S. Application Data

(60) Provisional application No. 61/162,118, filed on Mar. 20, 2009.

(51) Int. Cl.
| | |
|---|---|
| *H04W 4/00* | (2009.01) |
| *H04B 7/06* | (2006.01) |
| *H04B 7/04* | (2006.01) |
| *H04W 72/04* | (2009.01) |
| *H04L 25/03* | (2006.01) |

(52) U.S. Cl.
CPC ......... *H04B 7/0632* (2013.01); *H04W 72/0406* (2013.01); *H04L 2025/03426* (2013.01); *H04L 25/03343* (2013.01); *H04B 7/0417* (2013.01); *H04L 2025/03802* (2013.01)
USPC .......................................... 370/334; 370/252

(58) Field of Classification Search
USPC .................. 370/252, 248, 249, 334, 278, 329
See application file for complete search history.

(56) References Cited

U.S. PATENT DOCUMENTS

| | | | |
|---|---|---|---|
| 2003/0035490 A1 | 2/2003 | Gollamudi | |
| 2006/0203891 A1 | 9/2006 | Sampath et al. | |
| 2006/0285585 A1 | 12/2006 | Sampath | |
| 2007/0201566 A1* | 8/2007 | Solomon et al. | 375/260 |

(Continued)

FOREIGN PATENT DOCUMENTS

| | | |
|---|---|---|
| CN | 101197655 A | 6/2008 |
| CN | 101345566 A | 1/2009 |

(Continued)

OTHER PUBLICATIONS

Interdigital, et al., "MIMO candidate techniques for UTRA TDD", 3GPP Draft; R1-030445, 3rd Generation Partnership Project (3GPP), Mobile Competence Centre ; 650, Route Des Lucioles ; F-06921 Sophia-Antipolis Cedex ; France, vol. Ran WG1, No. Paris, France; May 13, 2003, XP050097581, [retrieved on May 13, 2003] Sections 2-3.1.

International Search Report and Written Opinion—PCT/US2010/027705, International Search Authority—European Patent Office—Dec. 1, 2010.

(Continued)

*Primary Examiner* — Gary Mui
(74) *Attorney, Agent, or Firm* — Anthony R. Morris

(57) ABSTRACT

A method for generating feedback data is described. A downlink message is received from a base station. It is determined whether full channel reciprocity or partial channel reciprocity is enabled at a transmitter. A mode for feedback data generation is determined. Feedback data is generated using the determined mode. The feedback data includes beamforming information. The feedback data is transmitted to the base station. The feedback data may include a channel quality indicator (CQI) and a rank.

52 Claims, 10 Drawing Sheets

(56) References Cited

U.S. PATENT DOCUMENTS

| | | | |
|---|---|---|---|
| 2007/0223423 A1 | 9/2007 | Kim et al. | |
| 2008/0285675 A1* | 11/2008 | Roberts | 375/267 |
| 2008/0310324 A1* | 12/2008 | Chaponniere | 370/254 |
| 2009/0003282 A1* | 1/2009 | Meylan et al. | 370/331 |
| 2009/0003475 A1 | 1/2009 | Erceg et al. | |
| 2010/0214169 A1* | 8/2010 | Kafle | 342/368 |
| 2011/0122971 A1* | 5/2011 | Kim et al. | 375/316 |

FOREIGN PATENT DOCUMENTS

| | | |
|---|---|---|
| WO | WO2007050544 | 5/2007 |
| WO | 2007105928 A1 | 9/2007 |
| WO | WO2009023681 | 2/2009 |
| WO | WO2009023860 | 2/2009 |
| WO | WO2009023863 A1 | 2/2009 |

OTHER PUBLICATIONS

Mai Vu, et al., "MIMO Wireless Linear Precoding", IEEE Signal Processing Magazine, IEEE Service Center, Piscataway, NJ, US, vol. 24, No. 5, Sep. 1, 2007, pp. 86-105, XP011194357, ISSN: 1053-5888 p. 87, col. 1, paragraph 3 p. 87, col. 2, paragraph 2—p. 89, col. 1, paragraph 3 p. 102, col. 2, paragraph 5—p. 103, col. 1, paragraph 2.
Samsung, "DL RS Designs for Higher Order MIMO," 3GPP TSG RAN WG1 #56 Athens, Greece, Feb. 9-13, 2009, R1-090619, 7 pages.
Taiwan Search Report—TW099108233—TIPO—Apr. 22, 2013.
Qualcomm Europe: "Feedback options in support of dual-stream beamforming" 3GPP Draft; R1-091449, 3rd Generation Partnership Project (3GPP), Mobile Competence Centre; 650, Route des Lucioles; F-06921 Sophia-Antipolis Cedex; France, no. Seoul, South Korea; Mar. 19, 2009, XP002603904 [retrieved on Mar. 19, 2009] the whole document.

\* cited by examiner

FEEDBACK MECHANISMS FOR BEAMFORMING OPERATION

RELATED APPLICATIONS

This application is related to and claims priority from U.S. Provisional Patent Application Ser. No. 61/162,118 filed Mar. 20, 2009, for "FEEDBACK MECHANISMS", the disclosure of which is expressly incorporated by reference herein in its entirety.

TECHNICAL FIELD

The present disclosure relates generally to communication systems. More specifically, the present disclosure relates to systems and methods for feedback mechanisms for beamforming operation.

BACKGROUND

Wireless communication systems are widely deployed to provide various types of communication content such as voice, video, data, and so on. These systems may be multiple-access systems capable of supporting simultaneous communication of multiple terminals with one or more base stations.

A problem that must be dealt with in all communication systems is fading or other interference. There may be problems with decoding the signals received. One way to deal with these problems is by utilizing beamforming With beamforming, instead of using each transmit antenna to transmit a spatial stream, the transmit antennas each transmit a linear combination of the spatial streams, with the combination being chosen so as to optimize the response at the receiver.

Smart antennas are arrays of antenna elements, each of which receive a signal to be transmitted with a predetermined phase offset and relative gain. The net effect of the array is to direct a (transmit or receive) beam in a predetermined direction. The beam is steered by controlling the phase and gain relationships of the signals that excite the elements of the array. Thus, smart antennas direct a beam to each individual mobile unit (or multiple mobile units) as opposed to radiating energy to all mobile units within a predetermined coverage area (e.g., 120° as conventional antennas typically do. Smart antennas increase system capacity by decreasing the width of the beam directed at each mobile unit and thereby decreasing interference between mobile units. Such reductions in interference result in increases in signal-to-interference and signal-to-noise ratios that improve performance and/or capacity. In power controlled systems, directing narrow beam signals at each mobile unit also results in a reduction in the transmit power required to provide a given level of performance.

Wireless communication systems may use beamforming to provide system-wide gains. In beamforming, multiple antennas on the transmitter may steer the direction of transmissions towards multiple antennas on the receiver. Beamforming may increase the signal-to-noise ratio (SNR). Beamforming may also decrease the amount of interference received by terminals in neighboring cells. Benefits may be realized by providing improved beamforming techniques.

DETAILED DESCRIPTION

Figure 1:
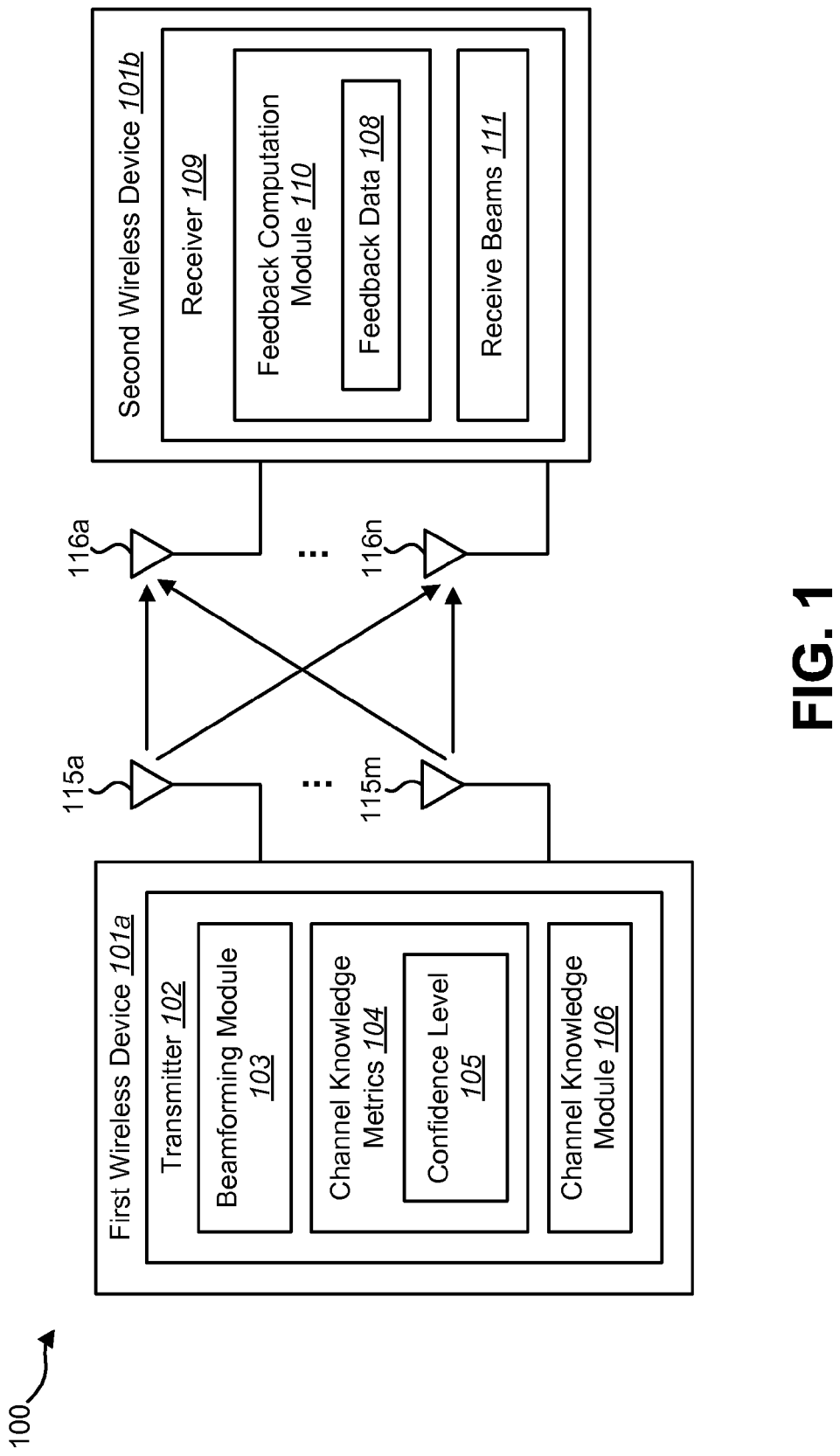
FIG. 1 shows a wireless communication system with multiple wireless devices.

A method for generating feedback data is described. A downlink message is received from a base station. It is determined whether full channel reciprocity or partial channel reciprocity is enabled at a transmitter. A mode for feedback data generation is determined. Feedback data is generated using the determined mode. The feedback data includes beamforming information. The feedback data is transmitted to the base station.

The downlink message may use a channel state information reference signal (CSI-RS) instead of a common reference signal (CRS) for channel estimation for feedback. The downlink message may use a demodulation reference signal (DM-RS) for channel estimation and feedback purposes. At least one of a demodulation reference signal (DM-RS), a channel station information reference signal (CSI-RS) and a common reference signal (CRS) may be used for interference estimation for feedback purposes. The feedback data may include an interference covariance, a channel quality indicator (CQI), a rank and/or one or more precoding vectors. The determined mode may be a closed-loop mode, an open-loop mode or a partial feedback mode.

Channel estimates may be obtained from available reference signal ports for feedback (RSFB). A CQI, a rank and one or more precoding vectors may be computed based on the channel estimates. Full channel reciprocity may be enabled at the transmitter, and it may be determined whether channel knowledge for all transmit antennas is present at a receiver. Channel knowledge for all transmit antennas may not be present at the receiver, so the CQI and rank may be computed based on the number of receive beams and available channel knowledge.

Channel knowledge for all transmit antennas may be present at the receiver, therefore the CQI and rank may be computed by assuming that eigen-beamforming is applied to a downlink channel. Partial channel reciprocity may be enabled at the transmitter, and it may be determined whether a) a feedback channel exists for channel information that is not known at the transmitter, b) to use beams obtained by channel knowledge available at the transmitter for feedback computation, or c) to assume pseudo eigen-beamforming for computing the CQI and rank.

A feedback channel may exist for channel information that is not known at the transmitter, therefore missing information may be sent to the transmitter using the feedback channel, and the CQI may be computed using full channel knowledge. Beams obtained by channel knowledge available at the transmitter may be used for feedback computation, therefore the CQI and rank may be computed using available channel knowledge.

Pseudo eigen-beamforming for computing the CQI and rank may be assumed; the CQI and rank may be computed using available channel knowledge while the beams are computed using channel knowledge that is also known to be available at the transmitter; random beams orthogonal to those beams may be assumed for other layers for each rank. Layer shifting may be used with pseudo eigen-beamforming.

A pseudo eigen-beamforming scheme may be determined Precoding vectors may be obtained. Directions orthogonal to the obtained precoding vectors may be selected. The precoding vectors and the selected directions may be combined to form a combined precoding matrix. One or more combined precoding matrices may be created using different selected directions. The CQI may be computed using the one or more combined precoding matrices. The rank may also be computed.

The feedback data may include one or more precoding vectors and a quantized version of a channel. The feedback data may be based on at least one of a receiver interference structure, antenna beamforming gains, receive ports available and predefined precoding matrices. The method may be performed by a wireless communication device or a wireless device configured to operate in a multiple-input and multiple-output (MIMO) wireless communication system. The wireless communication system may be a frequency division duplex (FDD) system or a time division duplex (TDD) system.

A wireless device configured for generating feedback data is also described. The wireless device includes a processor, memory in electronic communication with the processor, and instructions stored in the memory. The instructions are executable by the processor to receive a downlink message from a base station, determine whether full channel reciprocity or partial channel reciprocity is enabled at a transmitter, determine a mode for feedback data generation and generate feedback data using the determined mode. The feedback data includes beamforming information. The instructions are also executable to transmit the feedback data to the base station.

A wireless device configured for generating feedback data is described. The wireless device includes means for receiving a downlink message from a base station, means for determining whether full channel reciprocity or partial channel reciprocity is enabled at a transmitter, means for determining a mode for feedback data generation and means for generating feedback data using the determined mode. The feedback data includes beamforming information. The wireless device also includes means for transmitting the feedback data to the base station.

A computer-program product for a wireless device configured for generating feedback data is described. The computer-program product includes a computer-readable medium having instructions thereon. The instructions include code for receiving a downlink message from a base station, code for determining whether full channel reciprocity or partial channel reciprocity is enabled at a transmitter, code for determining a mode for feedback data generation and code for generating feedback data using the determined mode. The feedback data includes beamforming information. The instructions also include code for transmitting the feedback data to the base station.

Transmitter side beamforming can provide significant gains when channel knowledge is available at the transmitter. For single-layer beamforming, the transmission happens along the eigenvector of the channel covariance matrix corresponding to the largest eigenvalue. Capacity gains may be obtained by improving the received signal to interference plus noise ratio (SINR). The efficiency of beamforming may depend on the amount of knowledge a transmitter has of the channel between the transmitter and a receiver. More channel knowledge may mean better beamforming techniques.

FIG. 1 shows a wireless communication system 100 with multiple wireless devices 101. Wireless communication systems 100 are widely deployed to provide various types of communication content such as voice, data, and so on. These systems may be multiple-access systems capable of supporting communication with multiple users by sharing the available system resources (e.g., bandwidth and transmit power). A wireless device 101 may be a base station, a wireless communication device, a controller, or the like. The wireless communication system 100 may include a first wireless device 101a and a second wireless device 101b. The first wireless device 101a may be a transmitting wireless device while the second wireless 101b device may be a receiving wireless device.

Communications between the first wireless device 101a and the second wireless device 101b in a wireless system (e.g., a multiple-access system) may be achieved through transmissions over a wireless link. Such a communication link may be established via a single-input and single-output (SISO), multiple-input and single-output (MISO), or a multiple-input and multiple-output (MIMO) system. A MIMO system includes transmitter(s) 102 and receiver(s) 109 equipped, respectively, with multiple (NT) transmit antennas 115a-m and multiple (NR) receive antennas 116a-n for data transmission. SISO and MISO systems are particular instances of a MIMO system. The MIMO system can provide improved performance (e.g., higher throughput, greater capacity, or improved reliability) if the additional dimensionalities created by the multiple transmit and receive antennas are utilized.

The wireless communication system 100 may utilize MIMO. At the transmitter 102, each portion of a data stream, referred to as a layer, may be transmitted using a different beam. A beam may refer to a combination of one or more transmit antennas 115. At the receiver 109, the different portions of the data stream may be received by different antennas 116 and then combined. A MIMO channel formed by the NT transmit and NR receive antennas may be decomposed into one or more independent channels, which are also referred to as spatial channels; each of the independent channels corresponds to a dimension. The number of independent channels will be referred to as NS.

A MIMO system may support both time division duplex (TDD) and frequency division duplex (FDD) systems. In a TDD system, forward and reverse link transmissions are on the same frequency region so that the reciprocity principle allows the estimation of the forward link channel from the reverse link channel. This enables a transmitting wireless device (i.e., the first wireless device 101a) to extract transmit beamforming gain from communications received by the transmitting wireless device. In an FDD system, the forward and reverse link transmissions use different frequency regions. A transmitting wireless device may be unable to use the reverse link channel knowledge extracted from communications received by the transmitting wireless device to enable transmit beamforming gain, which requires forward link channel knowledge.

The wireless communication system 100 may be a multiple-access system capable of supporting communication with multiple wireless communication devices by sharing the available system resources (e.g., bandwidth and transmit power). Examples of such multiple-access systems include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems, single-carrier frequency division multiple access (SC-FDMA) systems, Third Generation Partnership Project (3GPP) Long Term Evolution (LTE) systems, and spatial division multiple access (SDMA) systems.

The terms "networks" and "systems" are often used interchangeably. A CDMA network may implement a radio technology such as Universal Terrestrial Radio Access (UTRA), cdma2000, etc. UTRA includes W-CDMA and Low Chip Rate (LCR) while cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). For clarity, certain aspects of the techniques are described below for LTE, and LTE terminology is used in much of the description below.

Single carrier frequency division multiple access (SC-FDMA) systems utilize single carrier modulation and frequency domain equalization. An SC-FDMA system has similar performance and essentially the same overall complexity as those of an OFDMA system. An SC-FDMA signal has lower peak-to-average power ratio (PAPR) because of its inherent single carrier structure. SC-FDMA has drawn great attention, especially in uplink communications where lower PAPR greatly benefits the mobile terminal in terms of transmit power efficiency. The use of SC-FDMA is currently a working assumption for uplink multiple access scheme in 3GPP Long Term Evolution (LTE) or Evolved UTRA.

The first wireless device 101a may include a transmitter 102. The transmitter 102 may include a beamforming module 103. Beamforming may refer to the use of multiple antennas to adjust the direction of transmission and/or reception of wireless signals. Beamforming may improve the signal-to-noise ratio (SNR). Beamforming may also reduce the interference to wireless devices in neighboring cells.

In a MIMO setup, eigen-beamforming may be applied by transmitting along the eigenvectors of the channel corresponding to the largest eigenvalues, providing beamforming and multiplexing gains. Rank selection and channel quality indicator (CQI) computation can be done assuming these vectors are the transmitted beams. Rank selection here refers to the selection of the number of transmitted beams. Channel quality indicator (CQI) computation typically involves determining the code rate/modulation format that can be supported on the different beams.

Transmitter 102 side beamforming can provide system-wide gains by having the transmitter 102 exploit knowledge of the channel between the transmitter 102 and a receiver 109 to select appropriate spatial directionality of the transmitted signal. Knowledge of a channel may be referred to as a channel knowledge metric 104. A transmitter 102 may include one or more channel knowledge metrics 104. Each channel knowledge metric 104 may refer to a different piece of data regarding the channel. A channel knowledge metric 104 may be received from a receiver 109 via feedback data 108. Feedback data 108 may include CQIs, rank information (RI) and a precoding matrix index (PMI). The CQI, RI and PMI may be computed at the second wireless device 101b using forward link pilots such as the common reference signal (CRS). Another of a channel knowledge metric 104 is channel reciprocity (i.e., measuring the channel variations for received signals and using this information to estimate the channel experienced by transmitted signals). For example, channel knowledge about the forward link may be obtained through reverse link pilots such as a sounding reference signal (SRS). Each channel knowledge metric 104 may have an associated confidence level 105 regarding the weight or confidence attached to the channel knowledge metric 104.

The transmitter 102 may include a channel knowledge module 106. The transmitter 102 may use the channel knowledge module 106 to determine the channel knowledge metrics 104. The channel knowledge module 106 may obtain channel knowledge from long term statistics of the observations, feedback data 108, and receiver-to-transmitter traffic.

A second wireless device 101b may receive transmissions from the first wireless device 101a using one or more receive antennas 116a-n. The second wireless device 101b may include a receiver 109. The number of antennas the second wireless device 101b may employ for transmissions may be fewer than the number of receive antennas 116. In this case, the first wireless device 101a can estimate the channel using reciprocity only to the receive antennas that were also employed by the second wireless device 101b to transmit.

The receiver 109 may include a feedback computation module 110. The feedback computation module 110 may be used by the receiver 109 to determine what feedback should be sent to the first wireless device 101a. The feedback computation module 110 may generate feedback data 108. Examples of feedback data 108 include a channel quality indicator (CQI), a rank report and spatial information such as the PMI. The channel quality indicator (CQI) may refer to channel estimates made by the receiver 109. The feedback data 108 may include the relative confidence levels for the channel quality indicators (CQI). The rank report may also be referred to as rank information (RI) and may indicate the recommended number of MIMO layers.

The channel quality indicators (CQI) and the rank report may be based on the pseudo eigen-beamforming mechanism that will be used by the transmitter 102 on the first wireless device 101a. Pseudo eigen-beamforming is discussed in more detail below. Both the channel quality indicators (CQI) and the rank report may be adaptive. The second wireless device 101b may consider several rank hypotheses in pseudo eigen-beamforming and select the rank and corresponding channel quality indicator (CQI) that maximizes some desirable criteria such as the spectral efficiency. The rank report refers to the recommended number of MIMO layers. The confidence level 105 corresponds to how accurate the CQI report for that ranks is.

In selecting the rank and channel quality indicators (CQI) to be reported, the receiver 109 may take into account robustness and different levels of confidence in the results for different ranks. For example, when the transmitting wireless device has channel knowledge to only one receive antenna of the receiving wireless device, the transmitting wireless device may use a pseudo eigen-beamforming scheme that involves using the beam corresponding to the channel knowledge of the one receive antenna for the first layer for rank 1 and 2, while using random beams for the second layer when the rank is 2. The CQI computation at the receiving wireless device may involve generating similar beams using the channel knowledge available at the receiving wireless device. In this case, the knowledge available at both the transmitter 102 and the receiver 109 may be more conclusive for a rank 1 transmission than for a rank 2 transmission, as the random beams considered at the receiver 109 and used at the transmitter 102 may be different. The confidence in the rank 1 CQI report would be more than the confidence in the rank 2 report for this case. The randomness and the associated structure assumed in beam construction may be coordinated between the transmitter 102 and the receiver 109.

The second wireless device 101b may report information about assumed beamforming operation explicitly. For example, if the second wireless device 101b is aware that the first wireless device 101a has channel knowledge corresponding to only a few receive antennas, the channel from some or all of the unobserved receive antennas 116 may be quantized and fed back to the transmitter 102 along with the channel quality indicators (CQI) and rank report. The CQI and rank report may be computed at the second wireless device 101b, assuming the transmitter 102 uses this additional information for beam forming, for example, assuming that the transmitter 102 has similar channel knowledge of all the receive antennas.

The receiver 109 may choose one or more of the possible precoding vectors as beam directions along which transmissions will happen. The choice of these precoding vectors may then be fed back to the transmitter 102 in addition to other feedback data 108, such as the CQI/RI. These precoding vectors could also be selected based on the channel knowledge available to the transmitter 102, in which case the precoding information does not need to be fed back to the transmitter 102. For example, in a system with four transmit antennas 115 and four receive antennas 116, if the transmitter 102 has knowledge of the channel to two receive antennas 116, the first two precoding vectors could be based on the eigen vectors to the composite channel for the two receive antennas 116 while the remaining two beams could be chosen in a number of ways, depending on what the receiver 109 is able to feedback to the transmitter 102.

The receiver 109 may also compute feedback, assuming a specific beamforming scheme such as pseudo eigen-beamforming is used where the transmitter 102 selects the first few beams using channel knowledge available to the transmitter 102 and uses random orthogonal beams for the remaining layers. The receiver 109 may compute the first few precoding vectors that it believes were used by the transmitter 102 and assume multiplexing of other layers sent in directions random (possibly over a defined set) and orthogonal to the subspace spanned by the originally chosen precoding vectors to compute the CQI for one choice of rank. Such computation can be repeated for different ranks and one or more rank/CQI pairs may be fed back to the transmitter 102. The CQI report may use multiple sets of random beams. For example, the CQI report could be the average of CQI with one CQI value computed for one set of randomly chosen orthogonal beams.

The transmitter 102 may partially use the information fed back from the second wireless device 101b and compute or adjust some of the parameters based on all the knowledge available. For example, the transmitter 102 may override the rank report and adjust the channel quality indicators (CQI) accordingly. In one configuration, the receiver 109 may only feed back the channel quality indicators (CQI) to help the transmitter 102 determine the interference level at the receiver 109. The transmitter 102 may then compute the rank based on the available knowledge.

In one configuration, the beamforming module 103 may be used for pseudo eigen-beamforming (PeB). Beamforming vectors may be constructed based on the knowledge about the direction of the channel. Random values may be assumed for the parts of the channel that are neither observable nor estimable based on the knowledge available at the transmitter 102. The beamforming may be done in such a way that the random values (and hence the random directions of the beams) are in the subspace orthogonal to the known eigen-directions.

PeB may be used in scenarios where the knowledge of the channel at the transmitter 102 is not complete. PeB may also be used in scenarios where reduction in the amount of feedback data 108 from the receiver 109 to the transmitter 102 is desired. PeB may further be used in scenarios where the information available from different sources about different parts of the channel have different confidence levels 105. One such scenario would be a TDD system with a significant calibration mismatch at the second wireless device 101b. In this case, partial feedback from the second wireless device 101b may prove to be more reliable than channel knowledge metrics 104 obtained at the first wireless device 101a from the sounding reference signal (SRS) transmissions of the second wireless device 101b to the first wireless device 101a.

PeB may be used with multiple codeword or single codeword MIMO operation. In order to reduce the overhead of acknowledgments and also provide more robustness across the codewords, layer shifting and/or single codeword operation may be enforced when PeB is used. As discussed above, the data stream may be split into multiple parts. Each part may be encoded using a channel code to get a codeword. Data in different codewords may be treated as independent data. A codeword may further be split into multiple layers. In a MIMO transmission of rank K, K layers may be transmitted using K beams. These layers may be from different codewords. No layer shifting refers to the case when the beams used for the different layers are fixed. Layer shifting refers to the case when the layer to beam mapping changes in a pre-determined manner. Layer shifting is useful when the number of codewords is more than one. The mode decision may depend on the rank of transmission and the amount of channel knowledge. Thus, the mode decision may depend on the reliability of the beamforming.

In one example of pseudo eigen-beamforming, a first wireless device 101a with eight transmit antennas 115 may transmit to a second wireless device 101b with two receive antennas 116. The first wireless device 101a may have knowledge of the channel to one of the receive antennas 116 through a sounding reference signal (SRS) transmission. The first wireless device 101a may also be provided with quantized channel information for the other receive antenna 116. The first wireless device 101a may use the eigenvectors corresponding to the channel to the two receive antennas 116 as the beam directions. Alternatively, the first wireless device 101a may form the beam directions by QR decomposition on the channel obtained from a sounding reference signal (SRS) transmission and feedback data 108. The ordering of the channels in QR decomposition may be based on the reliability of each source.

In another example of pseudo eigen-beamforming, a first wireless device 101a may have knowledge of the channel to only one of the receive antennas 116. In this case, the first wireless device 101a can transmit in the direction of the channel to the receiver antenna 116 and a random beam direction orthogonal to the former direction. Random beams may be different across frequency and time to provide better diversity and/or more accurate rate prediction. The transmission and feedback in this case can be aligned by the second wireless device 101b following similar beamforming construction in computing the rank and the CQI. The receiver 109 may include receive beams 111.

Figure 2:
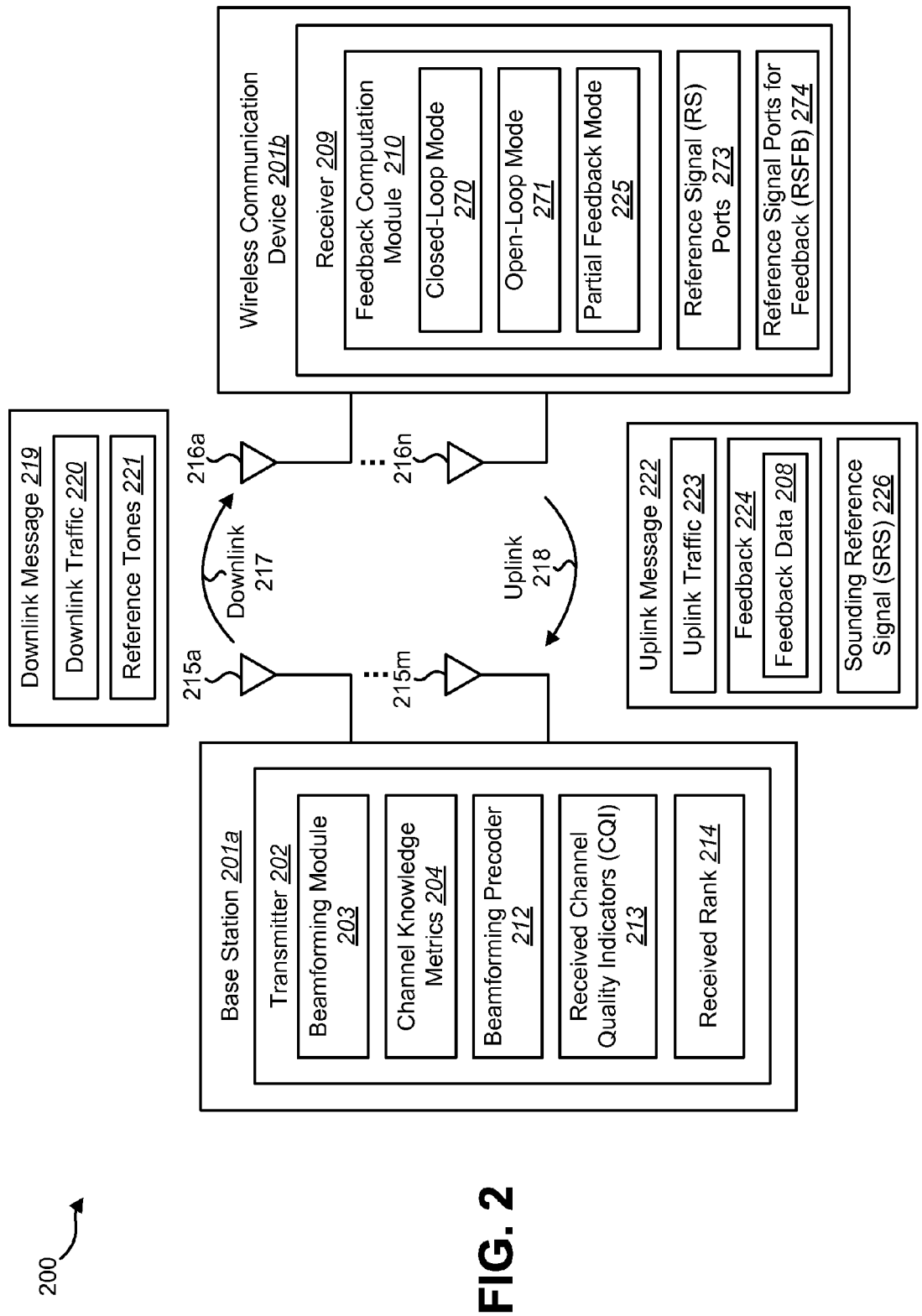
FIG. 2 shows another wireless communication system with multiple wireless devices.

FIG. 2 shows another wireless communication system 200 with multiple wireless devices 201. A wireless device 201 may be a base station 201a or a wireless communication device 201b. A base station 201a is a station that communicates with one or more wireless communication devices 201b. A base station 201a may also be referred to as, and may include some or all of the functionality of, an access point, a broadcast transmitter, a Node B, an evolved Node B, etc. The term "Base Station" will be used herein. Each base station 201a provides communication coverage for a particular geographic area. A base station 201a may provide communication coverage for one or more wireless communication devices 201b. The term "cell" can refer to a base station 201a and/or its coverage area depending on the context in which the term is used.

A wireless communication device 201b may also be referred to as, and may include some or all of the functionality of, a terminal, an access terminal, a user equipment (UE), a subscriber unit, a station, etc. A wireless communication device 201b may be a cellular phone, a personal digital assistant (PDA), a wireless device, a wireless modem, a handheld device, a laptop computer, etc. A wireless communication device 201b may communicate with zero, one, or multiple base stations 201a on the downlink 217 and/or uplink 218 at any given moment. The downlink 217 (or forward link) refers to the communication link from a base station 201a to a wireless communication device 201b, and the uplink 218 (or reverse link) refers to the communication link from a wireless communication device 201b to a base station 201a.

The base station 201a of FIG. 2 may be one configuration of the first wireless device 101a of FIG. 1. The base station 201a may include a transmitter 202. The transmitter 202 may include a beamforming module 203, channel knowledge metrics 204, a beamforming precoder 212, received channel quality indicators (CQI) 213, and received rank 214. Precoding/beamforming refers to the operation of mapping modulation symbols to different antennas. Thus, the beamforming precoder 212 may map modulation symbols to different antennas. A beam refers to a vector of complex scalars that specify how a modulation symbol should be transmitted on different antennas. The size of a beam is equal to the number of transmit antennas 215. If the modulation symbol is x and the i-th entry in the beam is bi then the transmitted signal on the i-th antenna is bi*x. With multiple beams, the transmitted signal on the different antennas can be written as [Beam 1, Beam 2, . . . . Beam n]*transpose([x1, x2, . . . xn]), where xk is the modulation symbol that is sent using beam k and the rank is n.

The base station 201a may send a downlink message 219 via one or more antennas 215a-m. The base station 201a may not use every available antenna 215a-m for beamforming. N_BF may refer to the number of antennas 215 used by the base station 201a for beamforming The downlink message 219 may include downlink traffic 220. The downlink message 219 may also include reference tones 221. The reference tones 221 may include reference signals provided for the purpose of the feedback (such as the channel state information reference signal (CSI-RS) concept in LTE-A Release 10 or an SRS transmission), reference signals provided for the purpose of the demodulation and feedback (such as common reference signals in LTE Release 8), and/or user specific reference signals provided for demodulation purposes (DRS in Release 8, UE-RS in Release 9 and 10). Reference signals and reference tones 221 may be used interchangeably.

The wireless communication device 201b of FIG. 2 may be one configuration of the second wireless device 101b of FIG. 1. The wireless communication device 201b may receive a downlink message 219 transmitted by the base station 201a. The wireless communication device 201b may receive the downlink message 219 over the downlink channel 217 using one or more receive antennas 216a-n. The wireless communication device 201b may use a receiver 209 and reference signal (RS) ports 273 to receive and decode the downlink message 219. Reference signal (RS) ports 273 refers to pilots sent along a (possibly fixed) beam direction. For example, a system with eight transmit antennas may have four common reference signal (CRS) ports. The first CRS port could be a beam with equal weights along antenna 0 and antenna 1. The second CRS port could be a beam with equal weight on antenna 2 and antenna 3. The third CRS port could be a beam with equal weight on antenna 4 and antenna 5. The fourth CRS port could be a beam with equal weight on antenna 6 and antenna 7. A separate CSI-RS may be sent for each antenna. Thus, there are eight CSI-RS ports. UE-RS ports could have pilots sent along beams that are selected based on UE feedback.

N_RS refers to the number of reference signal (RS) ports 273 for which the wireless communication device 201b can obtain estimates of the channel from the transmitter 202 for generation of channel quality indicators (CQI), rank information (RI) and possibly computing a precoding matrix index (PMI). N_RS thus refers to all the antenna ports including the common reference signal (CRS), the user equipment reference signal (UE-RS), the channel state information reference signal (CSI-RS), etc. The wireless communication device may also include reference signal ports for feedback (RSFB) 274. The reference signal ports for feedback (RSFB) 274 may be the independent reference signal ports that can be used for feedback. Reference signal ports for feedback (RSFB) 274 are discussed in further detail below in relation to FIG. 6.

The receiver 209 may include a feedback computation module 210. The feedback computation module 210 may be used to generate feedback data 208. The feedback computation module 210 may generate feedback data 208 using a closed-loop mode 270, an open-loop mode 271 and a partial-feedback mode 225. In closed-loop mode 270, the wireless communication device 201b may compute a channel quality indicator (CQI), rank and preferred precoding vectors as the feedback data 208 based on channel estimates obtained from the available ports. Closed-loop mode 270 is discussed in further detail below in relation to FIG. 5. Closed-loop mode 270 may be used in support of dual stream beamforming for FDD systems and may involve support of CSI-RS for channel state measurement and corresponding channel quality indicator (CQI)/precoding matrix index (PMI)/rank information (RI) reporting mechanisms, for example, when CRS isn't transmitted for all antennas. Closed-loop mode 270 for TDD may also be considered.

In open-loop mode 271, the wireless communication device 201b may not provide any information about the channel directionality to the base station 201a. Instead, the wireless communication device 201b may only compute and report the channel quality indicator (CQI) and possibly a rank. Open-loop mode 271 is discussed in further detail below in relation to FIG. 6. Open-loop mode 271 may be used for TDD operation while still extracting the benefits of beamforming by using reciprocity. In partial feedback mode 225, the wireless communication device 201b may provide a partial indication of the channel directionality observed along with the channel quality indicator (CQI) and rank information as the feedback data 208. Partial feedback mode 225 may be used for TDD operation. Beam forming gains in open loop mode 271 and partial feedback mode 225 may also be realizable in FDD operation in scenarios where reciprocity can be employed.

The wireless communication device 201b may then send uplink messages 222 to the base station 201b. An uplink message 222 may be transmitted via the uplink channel 218. An uplink message 222 may include uplink traffic 223. An uplink message 222 may also include feedback 224. The feedback 224 may include the feedback data 208 computed by the wireless communication device 201b. An uplink message 222 may further include a sounding reference signal (SRS) 226.

The wireless communication system 200 may be a time division duplex (TDD) system. In a TDD system, transmissions from the base station 201a to the wireless communication device 201b and transmissions from the wireless communication device 201b to the base station 201a may happen in the same frequency band. Because of the reciprocity of the uplink channel 218 and downlink channel 217, the base station 201a may be able to acquire an estimate of the downlink channel 217 through the sounding reference signal (SRS) 226 transmitted by the wireless communication device 201b to the base station 201a via the uplink channel 218 and an uplink message 222.

In one configuration, the number of transmit antennas used for uplink transmissions by a wireless communication device 201b may be different (less) than the number of receive antennas 216 on the wireless communication device 201b. For example, a wireless communication device 201b with two receive antennas may transmit a sounding reference signal (SRS) 226 from only one antenna. The base station 201 may only gain a partial knowledge of the downlink channel 217. This may be referred to as "partial channel reciprocity." In LTE Release 8, antenna switching of the sounding reference signal (SRS) 226 is possible where the wireless communication device 201b cycles over all available antennas to transmit the sounding reference signal (SRS) 226. For example, with two antennas, the wireless communication device 201b transmits a first instance of the sounding reference signal (SRS) 226 using the first antenna, a second instance of the sounding reference signal (SRS) 226 using the second antenna, a third sounding reference signal (SRS) using the first antenna, and so on. However, it is not a mandatory feature and may be undesirable in some wireless communication device 201b implementations. For example, antenna switching of the sounding reference signal (SRS) 226 may introduce an insertion loss. By using antenna switching of the sounding reference signal (SRS) 226, the base station 201a may obtain knowledge of the downlink channel 217 for all of the receive antennas 216 used by the wireless communication device 201b.

Figure 3:
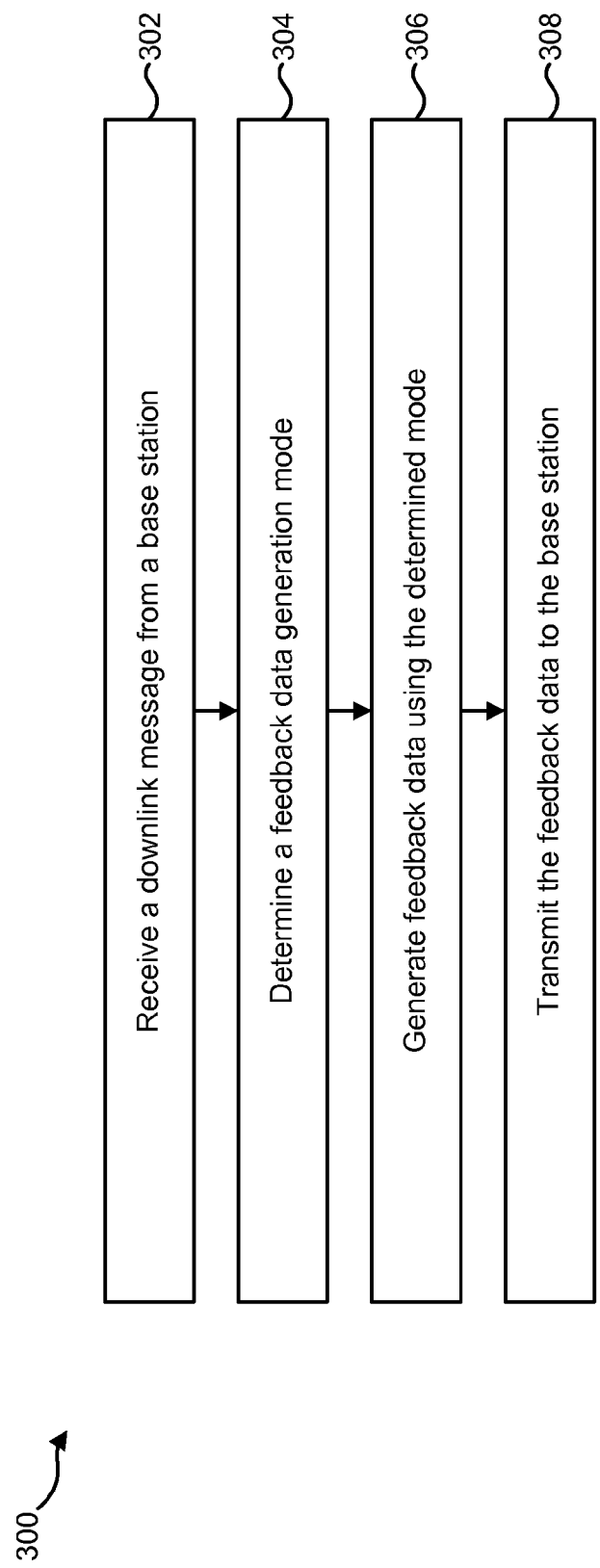
FIG. 3 is a flow diagram of a method for generating feedback data.

FIG. 3 is a flow diagram of a method 300 for generating feedback data 208. The method 300 may be performed by a wireless communication device 201b. The wireless communication device 201b may receive 302 a downlink message 219 from a base station 201a. The downlink message 219 may include downlink traffic 220 and/or reference tones 221. The wireless communication device 201b may then determine 304 a feedback data 208 generation mode. For example, the wireless communication device 201b may determine whether to use a closed-loop mode 270, an open-loop mode 271 or a partial feedback mode 225.

The wireless communication device 201b may generate 306 feedback data 208 using the determined mode. The wireless communication device 201b may transmit 308 the feedback data 208 to the base station 201a. In one configuration, the wireless communication device 201b may transmit 308 the feedback data 208 to the base station 201a in an uplink message 222.

Figure 4:
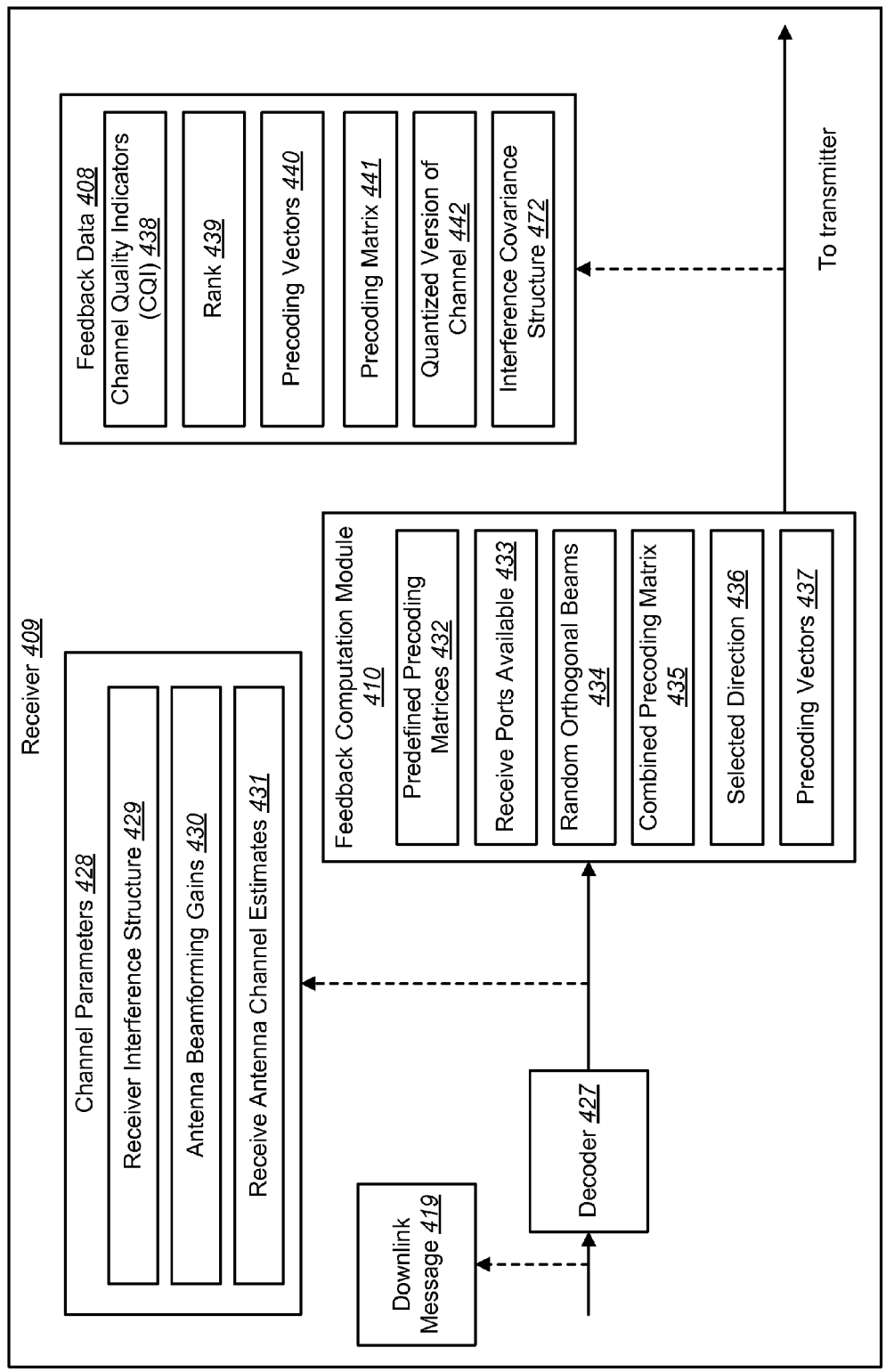
FIG. 4 is a block diagram illustrating a receiver for use in the present systems and methods.

FIG. 4 is a block diagram illustrating a receiver 409 for use in the present systems and methods. The receiver 409 of FIG. 4 may be one configuration of the receiver 109 of FIG. 1. The receiver 409 may be located on a wireless communication device 201b. The receiver 409 may include a decoder 427. The decoder 427 may receive a downlink message 419 from a base station 201a. The decoder 427 may then decode channel parameters 428 from the downlink message 419. For example, the decoder 427 may decode a receiver interference structure 429, antenna beamforming gains 430, and receive antenna channel estimates 431 from the downlink message 419. If a wireless communication device 201b can obtain receive antenna channel estimates 431 for all the beamforming antennas N_BF, feedback data 408 can capture the interference and beamforming gains from all the antennas 115 at the transmitter 102

The decoder 427 may provide the channel parameters 428 to a feedback computation module 410. The feedback computation module 410 may use the channel parameters 428 along with additional parameters to generate feedback data 408. Examples of parameters already known to the feedback computation module 410 include predefined precoding matrices 432, precoding vectors 437, receive ports available 433, random orthogonal beams 434, a combined precoding matrix 435 and a selected direction 436. The predefined precoding matrices 432 may be based on the precoding operation (i.e., large delay cyclic delay diversity (CDD) or beam-sweeping) agreed upon by the wireless communication device 201b and the base station 201a that will be applied in transmission. The combined precoding matrix 435 may be based on the precoding vectors 437. The selected direction 436 may be orthogonal to a selected precoder by the wireless communication device 201b.

Predefined codebooks may be used when full channel knowledge is available at the receiver 209 but may not be available at the transmitter 202. To select a codebook, the receiver 209 may feedback the channel quality indicators (CQI) 438, a precoding matrix 441 index (PMI) and rank information (RI). Eigen precoding may be used when full channel knowledge is available at the transmitter 202. To select a codebook in eigen precoding, the receiver 209 may feedback the channel quality indicators (CQI) 438 and rank information (RI). If only partial channel knowledge is available at the transmitter 202 but the receiver 209 has full channel knowledge, a few beams may be selected for the first few layers based on the channel knowledge available at the transmitter 202 plus random beams for the remaining layers. In one configuration, if partial channel knowledge is available at the transmitter 202, the receiver 209 may quantize and feedback the channel information not known to the transmitter 202 using a codebook.

The feedback computation module 410 may then generate feedback data 408. The feedback data 408 may be transmitted from the wireless communication device 201b to the base station 201a. In one configuration, the feedback data 408 may be transmitted to the base station 201a via an uplink message 222. Feedback data 408 may include channel quality indicators (CQI) 438, rank 439, precoding vectors 440, a precoding matrix 441, a quantized version of the channel 442 and a quantized version of the interference covariance 472. The channel quality indicators (CQI) 438 may account for interference and capture the beamforming gain. The beamforming gains may be from all the antennas 215 used in transmission and not only the antennas for which CRS is transmitted. The wireless communication device 201b may need to use newly defined CSI-RS for this purpose.

Release 8 LTE CRS can provide channel estimates for four antennas at most. The number of antennas used for beamforming N_BF may be greater than the number of CRS ports. For example, in an eight antenna system, the base station 201a may transmit CRS along four fixed beams (four virtual antennas also referred to as CRS antenna ports) while beamforming should be possible with all eight antennas. The feedback data 408 may only be based on the channels observed from the beams 111. Thus, the feedback data 408 may not capture the beamforming gains fully. This may affect the performance of dual-stream beamforming for FDD and possibly in TDD systems. A receiver 109 may be able to estimate only part of the entire channel between the physical antennas 115 at the transmitter 102 and the physical antennas 116 at the receiver 109. This may be the case in LTE Release 8 downlink designs, where channel estimates are based on CRS.

Release 8 LTE CRS ports are used for both demodulation and feedback purposes. By introducing a feedback reference signal (RS) with low duty cycle, different wireless communication devices 201b may obtain knowledge of a channel for feedback purposes. The overhead of such a reference signal may be very small. Having such a reference signal may provide beamforming gains from all the transmit antennas 215 (and not only the beams that are used for transmitting the common reference signal) for both FDD and TDD.

The number of CRS ports advertised in Release 9 is at most four. In commercial deployments, the number of CRS ports may only be two. Because the CRS ports are used in demodulation, the overhead associated with the CRS ports is large. At the same time, the number of transmit antennas 115 for beamforming operation can be larger than the number of advertised CRS ports. A low duty cycle reference signal may be introduced that is only used for channel station information feedback along the lines of CSI-RS envisioned for Release 10. The beamforming gains of using all transmit antennas 115 relative to using only CRS beams can be large. Having a low overhead CSI-RS for all the transmit antennas can provide beamforming gains in FDD and possibly TDD systems. In TDD, a low overhead CSI-RS may be beneficial where open loop channel state estimation at the base station 201a based on the channel reciprocity principle can only provide partial information about the downlink channel 217 or in the presence of calibration issues. The beamforming gains may be attainable for asymmetric antenna configurations for the transmit chain and receive chain at the wireless communication device 201b and are not affected by a calibration mismatch in the transmit chain and receive chain.

It may be possible to use demodulation reference signal (DM-RS) (along with the channel estimate obtained from the reference signal (RS) ports 273) ports for computation of channel quality indicators (CQI) 438 and rank 439 for next packet transmissions. In this case, the channel quality indicators (CQI) 438 and rank 439 reporting may need to be aperiodic with a request from the base station 201a. Although channel quality indicators (CQI) 438 and rank 439 computation this way captures the beamforming gains, such a mechanism may not be reliable for cases where UE-RS is allocated in a small part of the band or for users with bursty traffic sources. Although this reporting mechanism is accurate, it may not be efficient even at moderate mobility as it requires frequent reporting by the wireless communication device 201b.

To capture beamforming gains (especially in an FDD system) for scenarios where the number of transmit antennas 115 is greater than four, a new precoding structure may need to be considered. The granularity of report in time and frequency can be made configurable. In particular, the frequency selective report (i.e., subband based) or wideband report can be considered as in Release 8.

Layer shifting for rank 2 transmissions can be considered in different modes of operation. Such a mechanism may be beneficial in partial feedback mode and can also be used for overhead reduction.

Methods of signaling information regarding the spatial interference structure and gains associated with them may also be configured. This is also applicable for the case that the wireless communication device 201b has a partial estimate of the channel. One example of such signaling is for the wireless communication device 201b to provide channel quality indicators (CQI) 438, rank 439 and precoding matrix 441 index (PMI) feedback to the base station 201a. This is essentially the closed-loop mode 270 for precoding discussed above in relation to FIG. 2. The beamforming operation (PMI report) can capture the interference and channel structure simultaneously.

An interference covariance structure 472 may be signaled to the base station 201a. This may be applicable when a dominant interfering direction is detected at the wireless communication device 201b. The signaling may be achieved based on a low duty cycle (possibly upper layer) signaling. The interference covariance structure 472 may be used in the presence of a persistent long-term covariance structure of the interference. The base station 201a may then use the interference covariance structure 472 in computing the beamforming precoding vectors 440, rank 439, and channel quality indicators (CQI) 438. The time-frequency reporting granularity of interference covariance structure 472 could be configurable.

Figure 5:
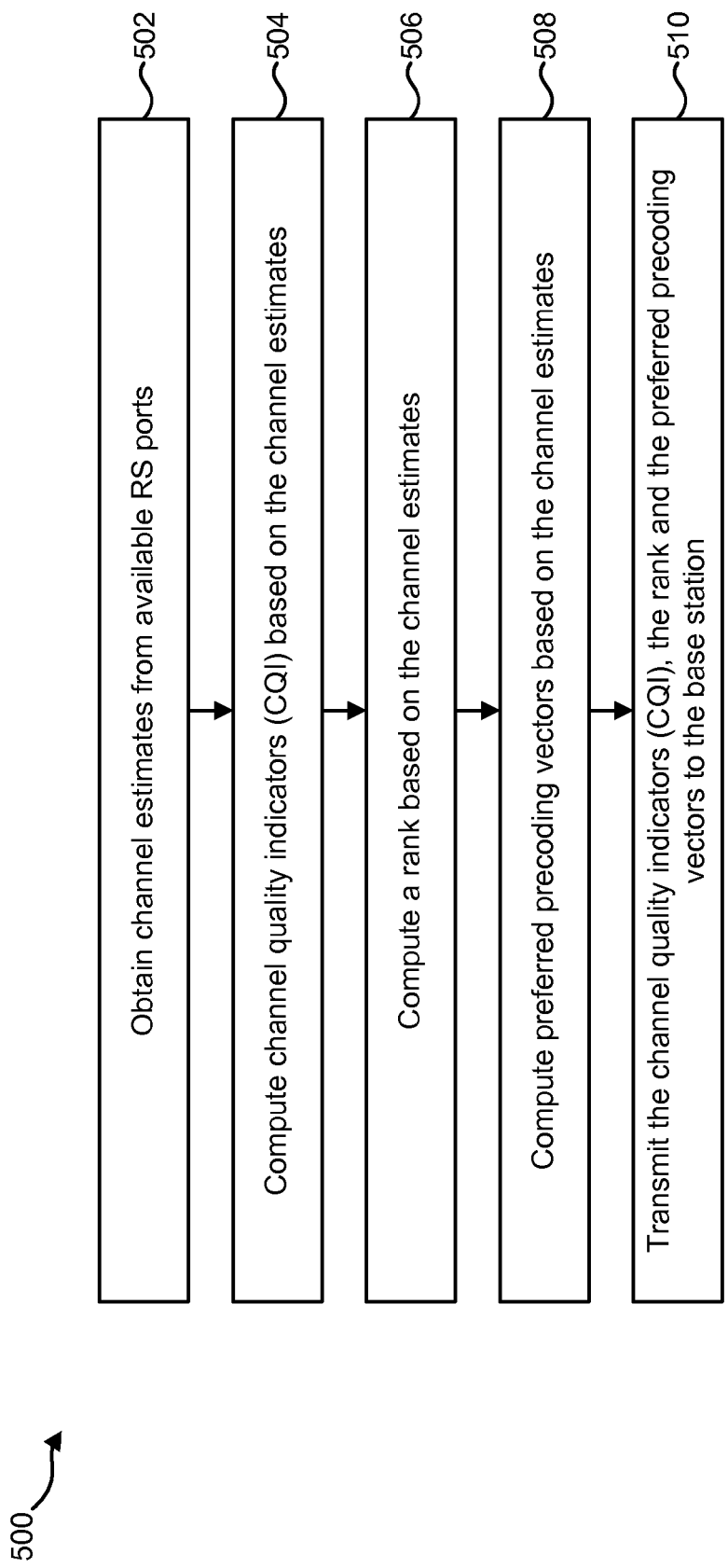
FIG. 5 is a flow diagram of a method for generating feedback data using a closed-loop mode.

FIG. 5 is a flow diagram of a method 500 for generating feedback data 408 using a closed-loop mode 270. The method 500 may be performed by a wireless communication device 201b. Closed-loop mode 270 was discussed above in relation to FIG. 2. Generating feedback data 408 in closed-loop mode 270 may depend on the knowledge available at the wireless communication device 201b and at the base station 201a regarding the downlink channel 217.

The wireless communication device 201b may obtain 502 channel estimates from the available ports. The channel estimates may include receive antenna channel estimates 431. The available ports may include reference signal (RS) ports 273. The wireless communication device 201b may then compute 504 one or more channel quality indicators (CQI) 438 based on the channel estimates. The wireless communication device 201b may compute 506 a rank 439 corresponding to each channel quality indicator (CQI) 438 based on the channel estimates. The wireless communication device 201b may also compute 508 preferred precoding vectors 440 based on the channel estimates. The wireless communication device 201b may then transmit 510 the channel quality indicators (CQI) 438, the rank 439, and the preferred precoding vectors 440 to the base station 201a.

The base station 201a may transmit to the wireless communication device 201b on the downlink channel 217 using the reported precoding vectors 440, the reported channel quality indicators (CQI) 438 and the reported rank 439. Closed-loop mode 270 may be applicable to both FDD and TDD. The operation of closed-loop mode 270 may not be affected by the asymmetric configuration of transmit and receive antennas at the wireless communication device 201b and possible calibration mismatches in the transmit/receive chains, because the transmission is along the precoding vectors 440 reported by the wireless communication device 201b.

To enable closed-loop mode 270 operation, a precoding design for a higher number of transmit antennas 115 at the base station 201a may need to be provided. Furthermore, signaling and feedback of rank 439 and preferred precoding matrices 441 must also be enabled. If the number of RS antenna ports is less than the number of beamforming antennas N_BF, the beamforming gains obtained by such operation will be limited. Therefore, using Release 8 CRS for feedback purposes when N_BF is more than the number of CRS antenna ports can reduce the gains obtained by beamforming.

An alternative to using Release 8 CRS for feedback is providing a low duty cycle channel state information reference signal (CSI-RS) for the beamforming antennas that are used only for measurement and reporting (and not for demodulation). The overhead corresponding to such a feedback reference signal may be very small. Therefore, it may be worthwhile to consider introducing low duty cycle CSI-RS for feedback purposes.

Figure 6:
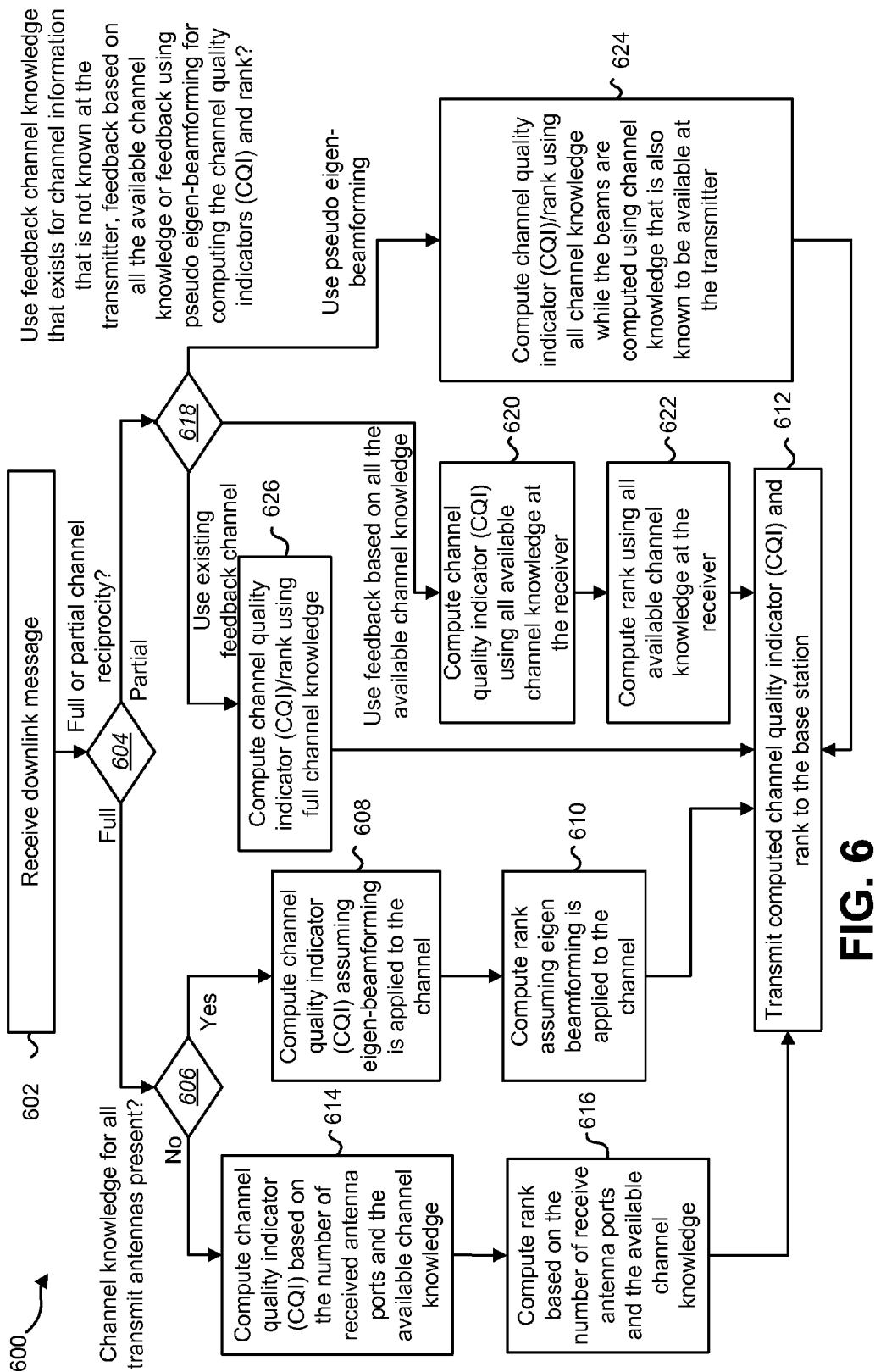
FIG. 6 is a flow diagram of a method for generating feedback data using an open-loop mode.

FIG. 6 is a flow diagram of a method 600 for generating feedback data 408 using an open-loop mode 271. The method 600 may be performed by a wireless communication device 201b. In open-loop mode 271, the wireless communication device 201b will not provide any information about the channel directionality to the base station 201a. Instead, the wireless communication device 201b may only report channel quality indicators (CQI) 438 and possibly rank 439.

In FDD mode, channel quality indicators (CQI) 438 and rank 439 computation at the wireless communication device 201b may be based on a set of predefined precoding matrices 441. Both the wireless communication device 201b and the base station 201a can agree on a precoding operation that will be applied in transmission. Channel quality indicator (CQI) 438 and rank 439 computation may be based on this knowledge to avoid large rate prediction mismatch.

With reciprocity, multiple scenarios can be considered. In one configuration, the wireless communication device 201b may report only the channel quality indicators (CQI) 438 corresponding to transmit diversity, as is done in transmission mode 7 of Release 8 to partially capture interference. The base station 201a may then select the rank and adjust the channel quality indicators (CQI) 438 for different layers based on the channel knowledge and the reported channel quality indicators (CQI) 438.

In a second scenario, the wireless communication device 201b may receive 602 a downlink message 219. The wireless communication device 201b may determine 604 whether full channel reciprocity or partial channel reciprocity is enabled at the transmitter 202. In partial channel reciprocity, the base station 201a may only gain a partial knowledge of the downlink channel 217, whereas in full channel reciprocity, the base station 201a may gain a full knowledge of the downlink channel 217.

If full channel reciprocity is enabled at the transmitter 202, the wireless communication device 201b may then determine 606 whether channel knowledge for all the transmit antennas 215 (full channel knowledge) is present at the receiver 209. This may occur, for example, when the number of available independent reference signal ports for feedback N_RSFB 274 equals the number of beamforming transmit antennas N_BF. If channel knowledge for all the transmit antennas 115 is present (i.e., N_RSFB=N_BF), the wireless communication device 201b can then compute 608 the channel quality indicators (CQI) 438 by assuming eigen-beamforming is applied to the downlink channel 217. The wireless communication device 201b may also compute 610 a rank 439 by assuming that eigen-beamforming is applied to the downlink channel 217. The computation of rank 439 and channel quality indicators (CQI) 438 may take into account the interference structure at the receiver and the beamforming gains from all the antennas. The wireless communication device 201b may then transmit 612 the computed channel quality indicators (CQI) 438 and rank 439 to the base station 201a. In this scenario, there is no need for transmission of the precoder information, as long as the channel quality indicator (CQI) 438 computation at the wireless communication device 201b is matched to the transmit beamforming at the base station 201a.

If channel knowledge for all the transmit antennas 115 is not present (i.e., N_RSFB<N_BF), the wireless communication device 201b may compute 614 the channel quality indicators (CQI) 438 based on the number of reference signal ports for feedback (RSFB) 274 available and the available channel knowledge using eigen-beamforming on the reference signal ports for feedback 274. The wireless communication device 201b may also compute 616 the rank 439 based on the number of reference signal ports for feedback (RSFB) 274 available and the available channel knowledge using eigen-beamforming on the reference signal ports for feedback (RSFB) 274. The wireless communication device 201b may then transmit 612 the computed channel quality indicators (CQI) 438 and rank 439 to the base station 201a. In this scenario, the base station 201a may adjust the channel quality indicators (CQI) 438 to capture the extra beamforming gain due to a transmission from the beamforming antennas as opposed to the number of reference signal ports for feedback (RSFB) 274 available N_RSFB that the report is based on.

If partial channel reciprocity is enabled, the wireless communication device 201b may determine 618 whether to use a) feedback channel knowledge that exists at the user equipment (UE) 201b for channel information that is not known at the transmitter 202, b) feedback based on all the available channel knowledge, with precoding beams generated using channel knowledge available only at the transmitter 202 such as channel knowledge for receive antennas 216 that were used for a sounding reference signal (SRS) 226 and/or c) feedback using pseudo eigen-beamforming for computing the channel quality indicators (CQI) 438 and the rank 439. In all of these cases, if the wireless communication device 201b has channel knowledge of all the transmit antennas 215, the wireless communication device 201b can generate the beams for channel quality indicator (CQI) computation assuming beamforming across all antennas used by the base station 201a for beamforming and the feedback is based on full channel knowledge. When the wireless communication device 201b has channel knowledge for a fewer number of antennas, the report may be based on assuming beam forming on the smaller number of antenna ports. If a feedback channel for channel information that is not known at the transmitter 202 exists, the wireless communication device 201b may send the missing information to the transmitter 202 using the feedback channel and compute 626 the channel quality indicator (CQI)/rank 438, 439 using full channel knowledge. The wireless communication device 201b may then transmit 612 the computed channel quality indicator (CQI) 438 and rank 439 to the base station 201a.

Even if beams obtained only by channel knowledge available at the transmitter 202 are used for feedback computation, the wireless communication device 201b may compute 620 the channel quality indicators (CQI) 438 using all available channel knowledge at the receiver 209. The wireless communication device 201b may also compute 622 the rank 439 using all available channel knowledge at the receiver. The wireless communication device 201b may then transmit 612 the computed channel quality indicators (CQI) 438 and rank 439 to the base station 201a.

If pseudo eigen-beamforming is assumed, the wireless communication device 201b may compute 624 the channel quality indicators (CQI) 438 and rank 439 using all available channel knowledge while the beams are computed using channel knowledge that is also known to be available at the transmitter 202, (for example, corresponding to channel estimates for receive antennas 216 that are also used to send a sounding reference signal (SRS) 226 transmission) and assume random beams orthogonal to those beams for other layers and for each rank 439. The wireless communication device may then transmit 612 the computed channel quality indicators (CQI) 438 and rank 439 to the base station 201a. The base station 201a may use pseudo eigen-beamforming in forming the beam directions. The base station 201a may use the channel quality indicators (CQI) 438 and rank 439 reported by the wireless communication device 201b to transmit along the directions obtained.

Figure 7:
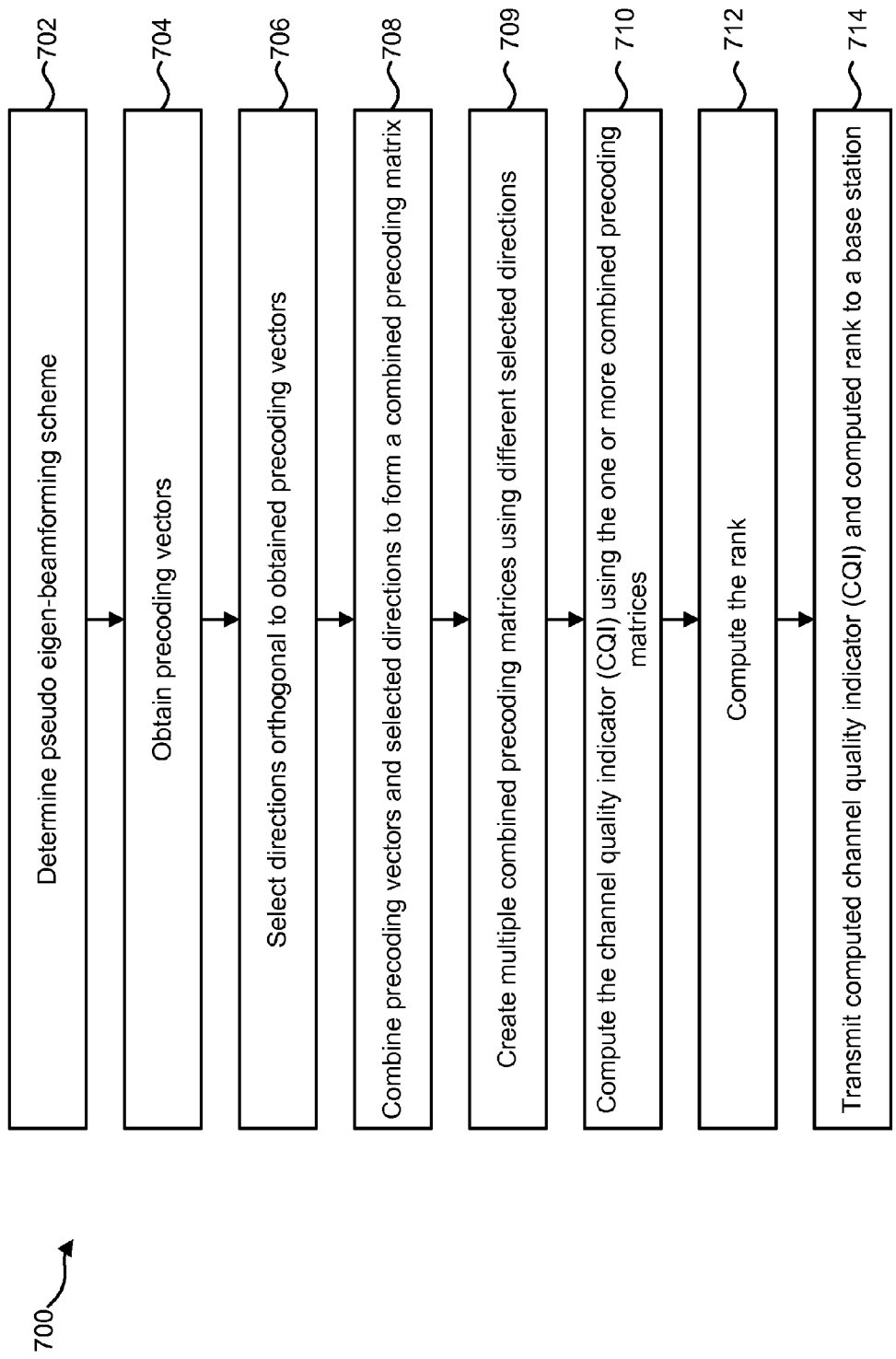
FIG. 7 is a flow diagram of a method for generating feedback data using a partial feedback mode.
Figure 8:
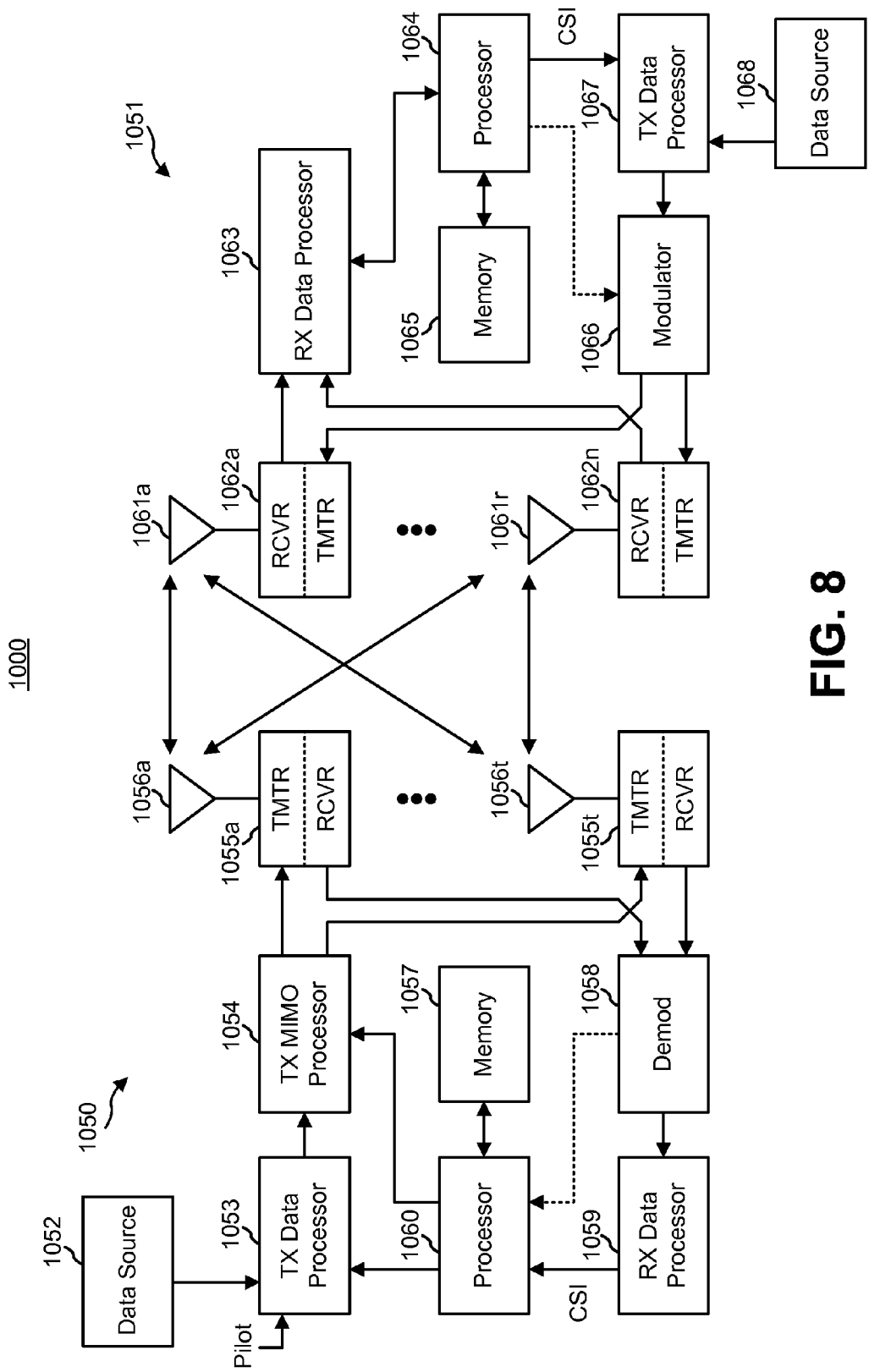
FIG. 8 is a block diagram of a transmitter and receiver in a multiple-input and multiple-output (MIMO) system.

FIG. 7 is a flow diagram of a method 700 for generating feedback data 408 using a partial feedback mode 225. The method 700 may be performed by a wireless communication device 201b. Partial feedback mode 225 was discussed above in relation to FIG. 2. In partial feedback mode 225, the wireless communication device 201b may provide a partial indication of the channel directionality observed along with channel quality indicators (CQI) 438 and rank 439 information. This information can be part of the preferred precoding matrix 441 if the wireless communication device 201b is operating using FDD. Alternatively, this information can be a quantized version of the channel 442 seen from the receive antennas for which sounding reference signal (SRS) 226 transmission in the uplink channel 218 does not occur.

The wireless communication device 201b may determine 702 a pseudo eigen-beamforming scheme. The wireless communication device 201b may obtain 704 precoding vectors 440 using the determined pseudo eigen-beamforming scheme. For example, the wireless communication device 201b may obtain 704 precoding vectors 440 using channel knowledge that is also known to be available at the transmitter 202. The wireless communication device 201b may then select 706 directions 436 orthogonal to the obtained precoding vectors 440. The wireless communication device 201b may combine 708 the precoding vectors 440 and the selected directions 436 to form a combined precoding matrix 435. The wireless communication device 201b may create 709 multiple combined precoding matrices 435 using different selected directions 436. The wireless communication device 201b may then compute 710 the channel quality indicator (CQI) 438 using the one or more combined precoding matrices 435. The wireless communication device 201b may also compute 712 the rank 439. The CQI and RI computation may use multiple combined precoding matrices created by using different random beams. The wireless communication device 201b may transmit 714 the computed channel quality indicators (CQI) 438 and the computed rank 439 to a base station 201a. The base station 201a may employ pseudo eigen-beamforming according to the rank 439 and the partial channel information provided through the feedback data 408.

A partial feedback mode 225 with partial channel reciprocity or significant calibration mismatch at the wireless communication device 201b may also be considered. In this case, the wireless communication device 201b can provide additional information regarding the channel observed on the receive antennas 216 not observable by the base station 201a. The wireless communication device 201b may compute the best channel quality indicators (CQI) 438 and rank 439 using the estimate of the channel for the receive antennas 216 known at the base station 201a. The wireless communication device 201b may also compute precoding vectors 437 approximating the channel to other receive antennas 216. The wireless communication device 201b may then report the channel quality indicators (CQI) 438, rank 439 and chosen precoding vectors 440 to the base station 201a.

The base station 201a may use the channel feedback data 408 along with the knowledge of the channel to construct a beamforming precoder. The base station 201a may then use the channel quality indicators (CQI) 438 and rank 439 selected by the wireless communication device 201b along with the constructed precoders to schedule the wireless communication device 201b.

Figure 9:
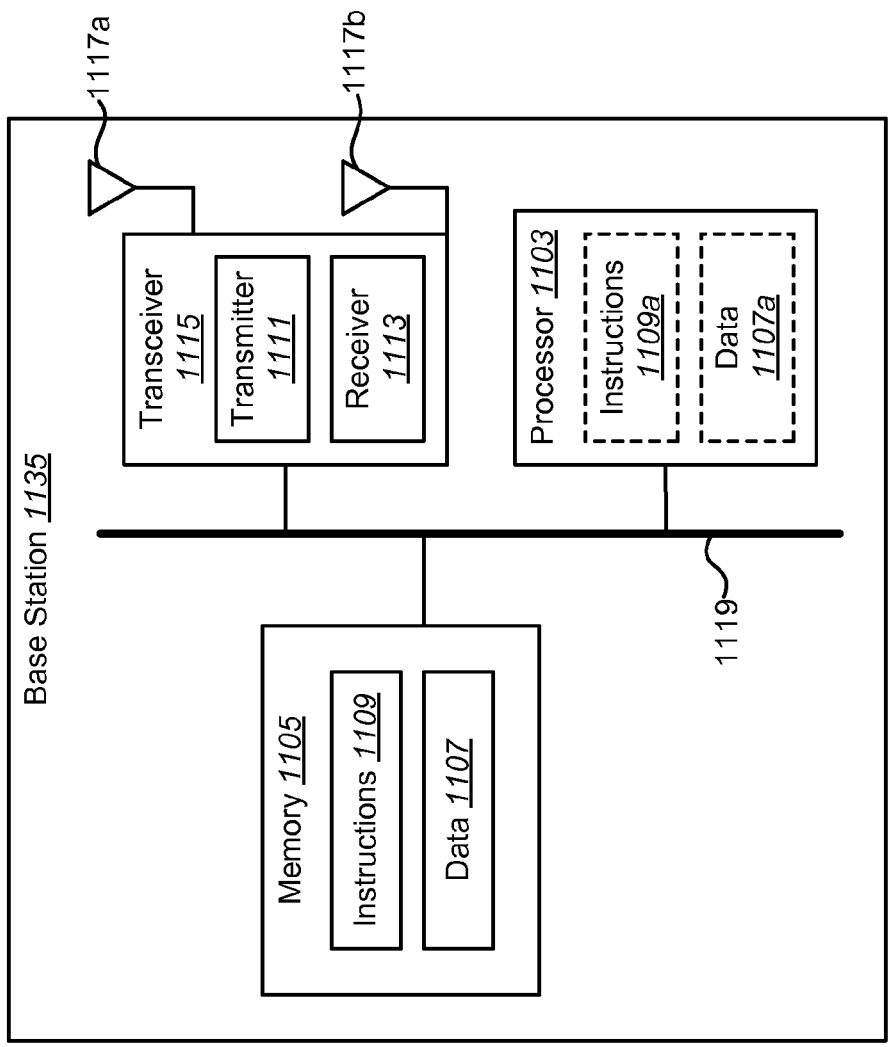
FIG. 9 illustrates certain components that may be included within a base station that is configured in accordance with the present disclosure.

FIG. 9 is a block diagram of a transmitter 1050 and receiver 1051 in a multiple-input and multiple-output (MIMO) system 1000. In the transmitter 1050, traffic data for a number of data streams is provided from a data source 1052 to a transmit (Tx) data processor 1053. Each data stream may then be transmitted over a respective transmit antenna 1056a-t. The transmit (Tx) data processor 1053 may format, code, and interleave the traffic data for each data stream based on a particular coding scheme selected for that data stream to provide coded data.

The coded data for each data stream may be multiplexed with pilot data using OFDM techniques. The pilot data may be a known data pattern that is processed in a known manner and used at the receiver 1051 to estimate the channel response. The multiplexed pilot and coded data for each stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by a processor.

The modulation symbols for all data streams may be provided to a transmit (TX) multiple-input multiple-output (MIMO) processor 1054, which may further process the modulation symbols (e.g., for OFDM). The transmit (TX) multiple-input multiple-output (MIMO) processor 1054 then provides NT modulation symbol streams to NT transmitters (TMTR) 1055a through 1055t. The TX transmit (TX) multiple-input multiple-output (MIMO) processor 1054 may apply beamforming weights to the symbols of the data streams and to the antenna 1056 from which the symbol is being transmitted.

Each transmitter 1055 may receive and process a respective symbol stream to provide one or more analog signals, and further condition (e.g., amplify, filter, and upconvert) the analog signals to provide a modulated signal suitable for transmission over the MIMO channel. NT modulated signals from transmitters 1055a through 1055t are then transmitted from NT antennas 1056a through 1056t, respectively.

At the receiver 1051, the transmitted modulated signals are received by NR antennas 1061a through 1061r and the received signal from each antenna 1061 is provided to a respective receiver (RCVR) 1062a through 1062r. Each receiver 1062 may condition (e.g., filter, amplify, and downconvert) a respective received signal, digitize the conditioned signal to provide samples, and further process the samples to provide a corresponding "received" symbol stream.

An RX data processor 1063 then receives and processes the NR received symbol streams from NR receivers 1062 based on a particular receiver processing technique to provide NT "detected" symbol streams. The RX data processor 1063 then demodulates, deinterleaves, and decodes each detected symbol stream to recover the traffic data for the data stream. The processing by RX data processor 1063 is complementary to that performed by TX MIMO processor 1054 and TX data processor 1053 at transmitter system 1050.

A processor 1064 may periodically determine which precoding matrix to use. The processor 1064 may store information on and retrieve information from memory 1065. The processor 1064 formulates a reverse link message comprising a matrix index portion and a rank value portion. The reverse link message may be referred to as channel state information (CSI). The reverse link message may comprise various types of information regarding the communication link and/or the received data stream. The reverse link message is then processed by a TX data processor 1067, which also receives traffic data for a number of data streams from a data source 1068, modulated by a modulator 1066, conditioned by transmitters 1062a through 1062r, and transmitted back to the transmitter 1050.

At the transmitter 1050, the modulated signals from the receiver are received by antennas 1056, conditioned by receivers 1055, demodulated by a demodulator 1058, and processed by an RX data processor 1059 to extract the reverse link message transmitted by the receiver system 1051. A processor 1060 may receive channel state information (CSI) from the RX data processor 1059. The processor 1060 may store information on and retrieve information from memory 1057. Processor 1060 may determine which pre-coding matrix to use for determining the beamforming weights and then process the extracted message.

FIG. 9 illustrates certain components that may be included within a base station 1135. A base station 1135 may also be referred to as, and may include some or all of the functionality of, an access point, a broadcast transmitter, a Node B, an evolved Node B, etc. The base station 1135 includes a processor 1103. The processor 1103 may be a general purpose single- or multi-chip microprocessor (e.g., an ARM), a special purpose microprocessor (e.g., a digital signal processor (DSP)), a microcontroller, a programmable gate array, etc. The processor 1103 may be referred to as a central processing unit (CPU). Although just a single processor 1103 is shown in the base station 1135 of FIG. 9, in an alternative configuration, a combination of processors (e.g., an ARM and DSP) could be used.

The base station 1135 also includes memory 1105. The memory 1105 may be any electronic component capable of storing electronic information. The memory 1105 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 1107 and instructions 1109 may be stored in the memory 1105. The instructions 1109 may be executable by the processor 1103 to implement the methods disclosed herein. Executing the instructions 1109 may involve the use of the data 1107 that is stored in the memory 1105. When the processor 1103 executes the instructions 1109, various portions of the instructions 1109a may be loaded onto the processor 1103, and various pieces of data 1107a may be loaded onto the processor 1103.

The base station 1135 may also include a transmitter 1111 and a receiver 1113 to allow transmission and reception of signals to and from the base station 1135. The transmitter 1111 and receiver 1113 may be collectively referred to as a transceiver 1115. A first antenna 1117a and a second antenna 1117b may be electrically coupled to the transceiver 1115. The base station 1135 may include (not shown) multiple transmitters, multiple receivers, multiple transceivers and/or additional antennas.

The various components of the base station 1135 may be coupled together by one or more buses, which may include a power bus, a control signal bus, a status signal bus, a data bus, etc. For the sake of clarity, the various buses are illustrated in FIG. 9 as a bus system 1119.

Figure 10:
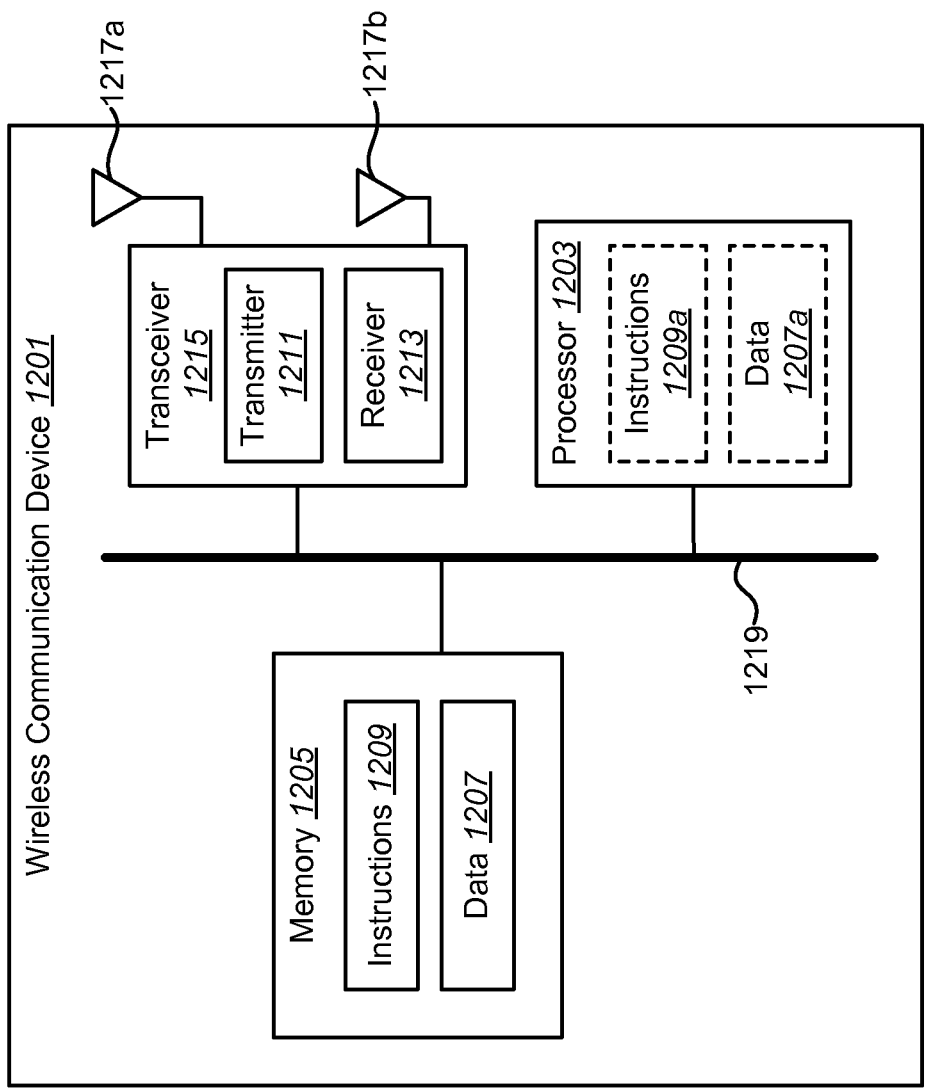
FIG. 10 illustrates certain components that may be included within a wireless communication device that is configured in accordance with the present disclosure.

FIG. 10 illustrates certain components that may be included within a wireless communication device 1201. The wireless communication device 1201 may be an access terminal, a mobile station, a user equipment (UE), etc. The wireless communication device 1201 includes a processor 1203. The processor 1203 may be a general purpose single- or multi-chip microprocessor (e.g., an ARM), a special purpose microprocessor (e.g., a digital signal processor (DSP)), a microcontroller, a programmable gate array, etc. The processor 1203 may be referred to as a central processing unit (CPU). Although just a single processor 1203 is shown in the wireless communication device 1201 of FIG. 10, in an alternative configuration, a combination of processors (e.g., an ARM and DSP) could be used.

The wireless communication device 1201 also includes memory 1205. The memory 1205 may be any electronic component capable of storing electronic information. The memory 1205 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 1207 and instructions 1209 may be stored in the memory 1205. The instructions 1209 may be executable by the processor 1203 to implement the methods disclosed herein. Executing the instructions 1209 may involve the use of the data 1207 that is stored in the memory 1205. When the processor 1203 executes the instructions 1209, various portions of the instructions 1209a may be loaded onto the processor 1203, and various pieces of data 1207a may be loaded onto the processor 1203.

The wireless communication device 1201 may also include a transmitter 1211 and a receiver 1213 to allow transmission and reception of signals to and from the wireless communication device 1201. The transmitter 1211 and receiver 1213 may be collectively referred to as a transceiver 1215. A first antenna 1217a and a second antenna 1217b may be electrically coupled to the transceiver 1215. The wireless communication device 1201 may also include (not shown) multiple transmitters, multiple receivers, multiple transceivers and/or additional antennas.

The various components of the wireless communication device 1201 may be coupled together by one or more buses, which may include a power bus, a control signal bus, a status signal bus, a data bus, etc. For the sake of clarity, the various buses are illustrated in FIG. 10 as a bus system 1219.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any non-transitory tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 3 and 5-7, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for generating feedback data by a wireless communication device, the method comprising:
   receiving a downlink message from a base station;
   determining a mode for feedback data generation;
   generating feedback data using the determined mode, wherein the feedback data comprises a channel quality indicator (CQI) and a rank, and wherein the channel quality indicator (CQI) and the rank are computed based on whether full channel reciprocity or partial channel reciprocity is enabled at a transmitter; and
   transmitting the feedback data to the base station.

2. The method of claim 1, wherein the downlink message uses a channel state information reference signal (CSI-RS) for channel estimation for feedback.

3. The method of claim 1, wherein the downlink message uses a demodulation reference signal (DM-RS) for channel estimation and feedback purposes.

4. The method of claim 1, wherein at least one of a demodulation reference signal (DM-RS), a channel station information reference signal (CSI-RS) and a common reference signal (CRS) is used for interference estimation for feedback purposes.

5. The method of claim 1, wherein the feedback data comprises an interference covariance.

6. The method of claim 1, wherein the feedback data comprises one or more precoding vectors.

7. The method of claim 6, wherein the determined mode is a closed-loop mode.

8. The method of claim 7, further comprising:
   obtaining channel estimates from available reference signal ports for feedback (RSFB);
   computing a CQI based on the channel estimates;
   computing a rank based on the channel estimates; and
   computing one or more precoding vectors based on the channel estimates.

9. The method of claim 6, wherein the determined mode is a partial feedback mode.

10. The method of claim 9, further comprising:
    determining a pseudo eigen-beamforming scheme;
    obtaining precoding vectors;

selecting directions orthogonal to the obtained precoding vectors;
combining the precoding vectors and the selected directions to form a combined precoding matrix;
creating one or more combined precoding matrices using different selected directions;
computing the CQI using the one or more combined precoding matrices; and
computing the rank.

11. The method of claim 1, wherein the determined mode is an open-loop mode.

12. The method of claim 11, wherein full channel reciprocity is enabled at the transmitter and further comprising determining whether channel knowledge for all transmit antennas is present at a receiver.

13. The method of claim 12, wherein channel knowledge for all transmit antennas is not present at the receiver and further comprising:
computing the CQI based on the number of receive beams and available channel knowledge; and
computing the rank based on the number of receive beams and available channel knowledge.

14. The method of claim 12, wherein channel knowledge for all transmit antennas is present at the receiver and further comprising:
computing the CQI by assuming that eigen-beamforming is applied to a downlink channel; and
computing the rank by assuming that eigen-beamforming is applied to the downlink channel.

15. The method of claim 11, wherein partial channel reciprocity is enabled at the transmitter and further comprising determining whether a) a feedback channel exists for channel information that is not known at the transmitter, b) to use beams obtained by channel knowledge available at the transmitter for feedback computation or c) to assume pseudo eigen-beamforming for computing the CQI and rank.

16. The method of claim 15, wherein a feedback channel exists for channel information that is not known at the transmitter and further comprising:
sending missing information to the transmitter using the feedback channel; and
computing the CQI using full channel knowledge.

17. The method of claim 15, wherein beams obtained by channel knowledge available at the transmitter are used for feedback computation and further comprising:
computing the CQI using available channel knowledge; and
computing the rank using available channel knowledge.

18. The method of claim 15, wherein pseudo eigen-beamforming for computing the CQI and rank is assumed and further comprising:
computing the CQI using available channel knowledge while the beams are computed using channel knowledge that is also known to be available at the transmitter, assuming random beams orthogonal to those beams for other layers for each rank; and
computing the rank using available channel knowledge while the beams are computed using channel knowledge that is also known to be available at the transmitter, assuming random beams orthogonal to those beams for other layers for each rank.

19. The method of claim 18, wherein layer shifting is used with pseudo eigen-beamforming.

20. The method of claim 1, wherein the feedback data comprises one or more precoding vectors.

21. The method of claim 1, wherein the feedback data comprises a quantized version of a channel.

22. The method of claim 1, wherein the feedback data is based on at least one of a receiver interference structure, antenna beamforming gains, receive ports available and predefined precoding matrices.

23. The method of claim 1, wherein the wireless communication device is configured to operate in a multiple-input and multiple-output (MIMO) wireless communication system.

24. The method of claim 23, wherein the wireless communication system is a frequency division duplex (FDD) system.

25. The method of claim 23, wherein the wireless communication system is a time division duplex (TDD) system.

26. A wireless device configured for generating feedback data, wherein the wireless device is a wireless communication device, comprising:
a processor;
memory in electronic communication with the processor;
instructions stored in the memory, the instructions being executable by the processor to:
receive a downlink message from a base station;
determine a mode for feedback data generation;
generate feedback data using the determined mode, wherein the feedback data comprises a channel quality indicator (CQI) and a rank, and wherein the channel quality indicator (CQI) and the rank are computed based on whether full channel reciprocity or partial channel reciprocity is enabled at a transmitter; and
transmit the feedback data to the base station.

27. The wireless device of claim 26, wherein the downlink message uses a channel state information reference signal (CSI-RS) for channel estimation for feedback.

28. The wireless device of claim 26, wherein the downlink message uses a demodulation reference signal (DM-RS) for channel estimation and feedback purposes.

29. The wireless device of claim 26, wherein at least one of a demodulation reference signal (DM-RS), a channel station information reference signal (CSI-RS) and a common reference signal (CRS) is used for interference estimation for feedback purposes.

30. The wireless device of claim 26, wherein the feedback data comprises an interference covariance.

31. The wireless device of claim 26, wherein the feedback data comprises one or more precoding vectors.

32. The wireless device of claim 31, wherein the determined mode is a closed-loop mode.

33. The wireless device of claim 32, wherein the instructions are further executable to:
obtain channel estimates from available reference signal ports for feedback (RSFB);
compute a CQI based on the channel estimates;
compute a rank based on the channel estimates; and
compute one or more precoding vectors based on the channel estimates.

34. The wireless device of claim 31, wherein the determined mode is an open-loop mode.

35. The wireless device of claim 34, wherein full channel reciprocity is enabled at the transmitter and wherein the instructions are further executable to determine whether channel knowledge for all transmit antennas is present at a receiver.

36. The wireless device of claim 35, wherein channel knowledge for all transmit antennas is not present at the receiver and wherein the instructions are further executable to:
compute the CQI based on the number of receive beams and available channel knowledge; and compute the rank based on the number of receive beams and available channel knowledge.

37. The wireless device of claim 35, wherein channel knowledge for all transmit antennas is present and wherein the instructions are further executable to:
compute the CQI by assuming that eigen-beamforming is applied to a downlink channel; and
compute the rank by assuming that eigen-beamforming is applied to the downlink channel.

38. The wireless device of claim 34, wherein partial channel reciprocity is enabled at the transmitter and wherein the instructions are further executable to determine whether a) a feedback channel exists for channel information that is not known at the transmitter, b) to use beams obtained by channel knowledge available at the transmitter for feedback computation or c) to assume pseudo eigen-beamforming for computing the CQI and rank.

39. The wireless device of claim 38, wherein a feedback channel exists for channel information that is not known at the transmitter and wherein the instructions are further executable to:
send missing information to the transmitter using the feedback channel; and
compute the CQI using full channel knowledge.

40. The wireless device of claim 38, wherein beams obtained by channel knowledge available at the transmitter are used for feedback computation and wherein the instructions are further executable to:
computing the CQI using available channel knowledge; and
computing the rank using available channel knowledge.

41. The wireless device of claim 38, wherein pseudo eigen-beamforming for computing the CQI and rank is assumed and wherein the instructions are further executable to:
computing the CQI using available channel knowledge while the beams are computed using channel knowledge that is also known to be available at the transmitter, assuming random beams orthogonal to those beams for other layers for each rank; and
computing the rank using available channel knowledge while the beams are computed using channel knowledge that is also known to be available at the transmitter, assuming random beams orthogonal to those beams for other layers for each rank.

42. The wireless device of claim 41, wherein layer shifting is used with pseudo eigen-beamforming.

43. The wireless device of claim 26, wherein the determined mode is a partial feedback mode.

44. The wireless device of claim 43, wherein the instructions are further executable to:
determine a pseudo eigen-beamforming scheme;
obtain precoding vectors;
select directions orthogonal to the obtained precoding vectors;
combine the precoding vectors and the selected directions to form a combined precoding matrix;
create one or more combined precoding matrices using different selected directions;
compute the CQI using the one or more combined precoding matrices; and
compute the rank.

45. The wireless device of claim 26, wherein the feedback data comprises one or more precoding vectors.

46. The wireless device of claim 26, wherein the feedback data comprises a quantized version of a channel.

47. The wireless device of claim 26, wherein the feedback data is based on at least one of a receiver interference structure, antenna beamforming gains, receive ports available and predefined precoding matrices.

48. The wireless device of claim 26, wherein the wireless device is configured to operate in a multiple-input and multiple-output (MIMO) wireless communication system.

49. The wireless device of claim 48, wherein the wireless communication system is a frequency division duplex (FDD) system.

50. The wireless device of claim 48, wherein the wireless communication system is a time division duplex (TDD) system.

51. A wireless communication device configured for generating feedback data, comprising:
means for receiving a downlink message from a base station;
means for determining a mode for feedback data generation;
means for generating feedback data using the determined mode, wherein the feedback data comprises a channel quality indicator (CQI) and a rank, and wherein the channel quality indicator (CQI) and the rank are computed based on whether full channel reciprocity or partial channel reciprocity is enabled at a transmitter; and
means for transmitting the feedback data to the base station.

52. A computer-program product for a wireless communication device configured for generating feedback data, the computer-program product comprising a non-transitory computer-readable medium having instructions thereon, the instructions comprising:
code for receiving a downlink message from a base station;
code for determining a mode for feedback data generation;
code for generating feedback data using the determined mode, wherein the feedback data comprises a channel quality indicator (CQI) and a rank, and wherein the channel quality indicator (CQI) and the rank are computed based on whether full channel reciprocity or partial channel reciprocity is enabled at a transmitter; and
code for transmitting the feedback data to the base station.

* * * * *